United States Patent [19]

Troutman

[11] Patent Number: 4,870,925
[45] Date of Patent: Oct. 3, 1989

[54] APPARATUS FOR CONTAINING A PET IN A VEHICLE TRUNK

[76] Inventor: Charles E. Troutman, Old Canyon Rd., Rt. No. 1, Murtaugh, Id. 83344

[21] Appl. No.: 174,308

[22] Filed: Mar. 28, 1988

[51] Int. Cl.$^4$ .............................................. A01K 1/035
[52] U.S. Cl. ......................................... 119/15; 296/76
[58] Field of Search ........................... 119/15, 19, 96; 296/24 C, 37.7, 76; 224/311, 320, 321

[56] References Cited

U.S. PATENT DOCUMENTS

| 2,897,781 | 9/1984 | Olson | 119/15 |
| 3,107,649 | 2/1980 | Blend, Jr. | 119/15 |
| 3,423,125 | 3/1983 | Saito | 119/15 |
| 4,779,916 | 10/1988 | Christie | 296/26 X |

FOREIGN PATENT DOCUMENTS

| 165756 | 2/1955 | Austria | 224/320 |
| 1630204 | 8/1971 | Fed. Rep. of Germany | 296/24.2 |
| 1494355 | 9/1967 | France | 296/24.2 |

Primary Examiner—Robert P. Swiatek
Assistant Examiner—Nicholas D. Lucchesi
Attorney, Agent, or Firm—John E. Benoit

[57] ABSTRACT

Apparatus for containing a pet in a partially open car trunk lid is disclosed. Grillwork, including adjustable rear and side members, is adapted in size for the particular vehicle. The rear member is removably secured to the underside of the car trunk lid and the side members are rotatably mounted to opposite sides of rear member. The distal ends of the slide members rest in the trunk rain trough and are slidable therein so that the trunk lid may be fully opened without removing the grillwork. Means are provided for securing the grillwork in a fixed position when the trunk is partially closed.

9 Claims, 4 Drawing Sheets

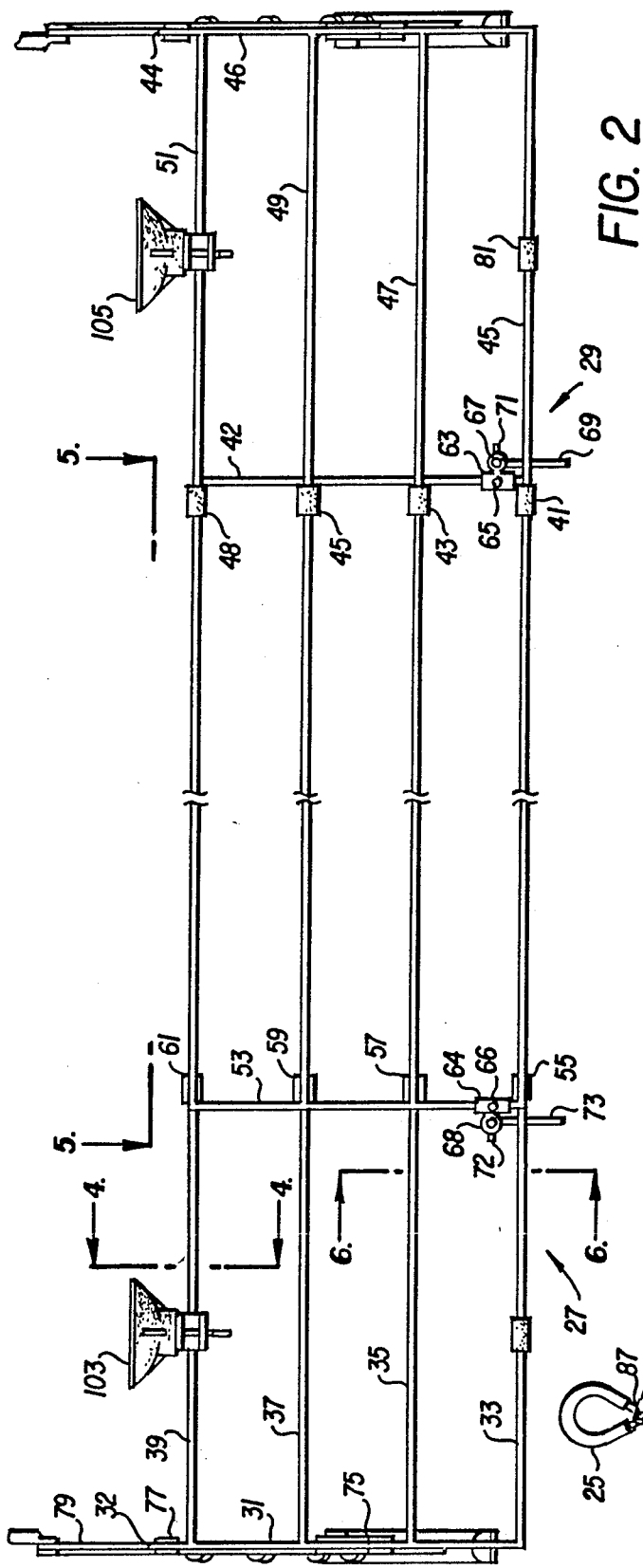
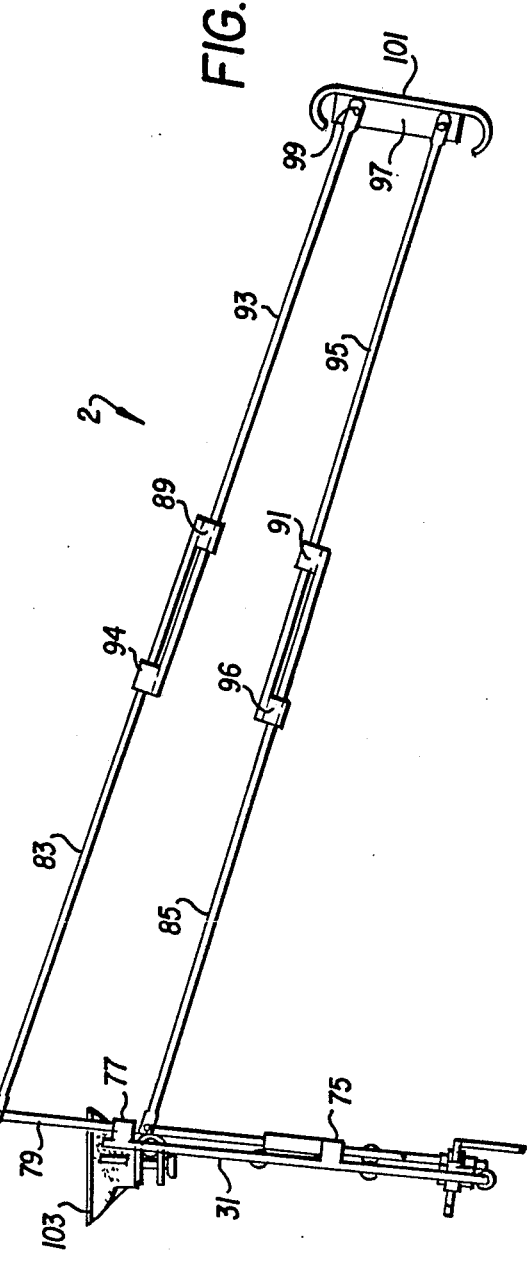
FIG. 2
FIG. 3

APPARATUS FOR CONTAINING A PET IN A VEHICLE TRUNK

This invention relates generally to pet containment means and, more particularly, to apparatus for converting a trunk of a vehicle into a pet containing means.

In present day practice it is very desirable for one to transport a dog or dogs under various circumstances. One such circumstance arises in hunting situations, where one wishes to take the dog but does not wish to have him inside the vehicle. Additionally, many people like to travel by automobile and carry their pets such as dogs and cats with them. If they are able to do this, they avoid the extra expenses of kennels and the like.

A number of devices have been proposed for carrying pets during travel without having them lodged in the interior of the vehicle. In some instances, pet carriers are mounted on the deck of the trunk and the animal is carried in that fashion. It has also been proposed to carry the animal in the trunk of the car and to maintain the trunk partially open while the animal is in the trunk.

In the first instance discussed above, the enclosure mounted on top of the deck of the trunk is very cumbersome and also blocks the view through the rear view mirror when so mounted. In the latter device, any proposals known to the present inventor have involved specifically making a container structure for a make of car. This is satisfactory for an individual who wishes to make the container himself, but for commercial purposes it would be impractical to attempt to make a container specifically for every make of automobile or other vehicle which has a trunk.

Accordingly, it is an object of the present invention to provide apparatus for containing a pet in a partially open trunk of a vehicle.

A further object of this invention is to provide apparatus for carrying a pet in the partially open trunk of a vehicle which is adjustable and is substantially universally usable with all types of vehicles having trunks.

Yet another object of this invention is to provide apparatus for containing a pet in the trunk of a vehicle which is adjustable and which may be substantially collapsed for storage purposes.

These and other objects of the invention will become apparent from the following description taken together with the drawings.

SUMMARY OF THE INVENTION

Apparatus is provided for containing a pet in a partially open car trunk, with such apparatus including grillwork having an adjustable rear and side members which may be easily adapted to the particular size of the trunk of the vehicle. The rear member is removably secured to the underside of the car trunk lid and the side members are rotatably mounted to opposite sides of the rear member. The distal ends of the side members rest in the trunk rain trough and are slidable therein so that the trunk lid may be fully opened without removing the grillwork. Means are also provided for securing the grillwork in a fixed position when the trunk is partially closed.

BRIEF DESCRIPTION OF THE DRAWINGS

FIG. 2 is a plan elevational view of the rear section of the grillwork of FIG. 1;

FIG. 3 is a side elevational view primarily illustrating the side grillwork as shown in FIG. 1;

DETAILED DESCRIPTION OF THE EMBODIMENTS OF THE INVENTION

Figure 1:
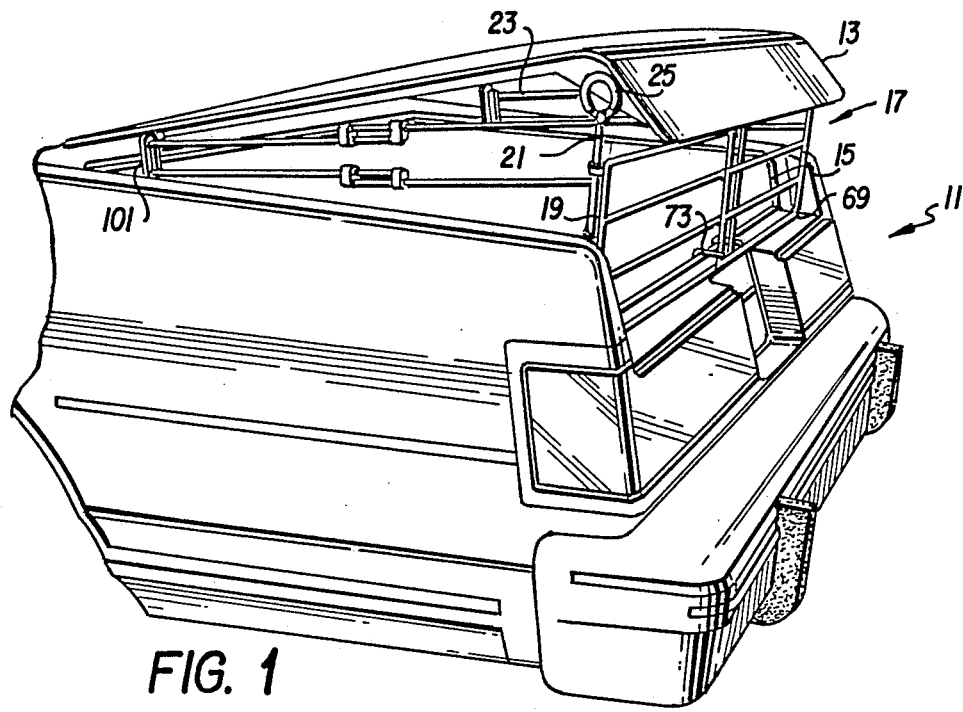
FIG. 1 is a partial perspective view of the trunk of an automobile with the preferred embodiment of the invention in place therein.

Turning now to FIG. 1, there is disclosed a perspective view of the rear end of automobile 11 having trunk lid 13 and associated trunk 15. Grillwork 17 of the present invention is shown in place in the trunk with lid 13 partially lowered. Grillwork 17 includes rear frame 19 and side frames 21 and 23, as well as spacer 25. The details of this structure will be described below.

Turning now to FIG. 2, it can be seen that rear frame 19 includes sections 27 and 29. Section 27 includes vertical rod 31 with horizontal rods 33, 35, 37, and 39 secured thereto by means such as welding and extending at substantially right angles to rod 31. These transverse rods terminate in a vertical rod 42 which is also welded to the ends of the rods. Vertical rod 31 terminates at its upper end 32 above transverse rod 39.

Section 29 is substantially similar to section 27 in that it includes vertical rod 46 terminating in its upper end 44 and has rods 45, 47, 49, and 51 extending transversely thereto and terminating in vertical rod 53, all rods being welded together.

In order to provide a telescoping feature, rods 33, 35, 37, and 39 have welded to their outer ends sleeves 41, 43, 45, and 48. Rods 45, 47, 49, and 51 of section 29 pass through these sleeves. In a similar manner, rods 45, 47, 49, and 51 have welded thereto sleeves 55, 57, 59, and 61, through which rods 33, 35, 37, and 39 pass. This allows the rear grillwork to be adjusted in length to fit the particular automobile for which it is to be used.

In order to avoid movement of the rear frame along the longitudinal axis of the automobile, sleeves 63 and 64 are provided on outer transverse rods 42 and 53. These sleeves have welded thereto transverse sleeves 67 and 68, through which L-shaped rods 69 and 73 pass. All of the sleeves include setscrews 65, 66, 71, and 72 so that they may be adjusted in accordance with the necessary use. L-shaped rods 69 and 73 are shown in place in FIG. 1 bearing against the inner rear of the trunk.

Figure 4:
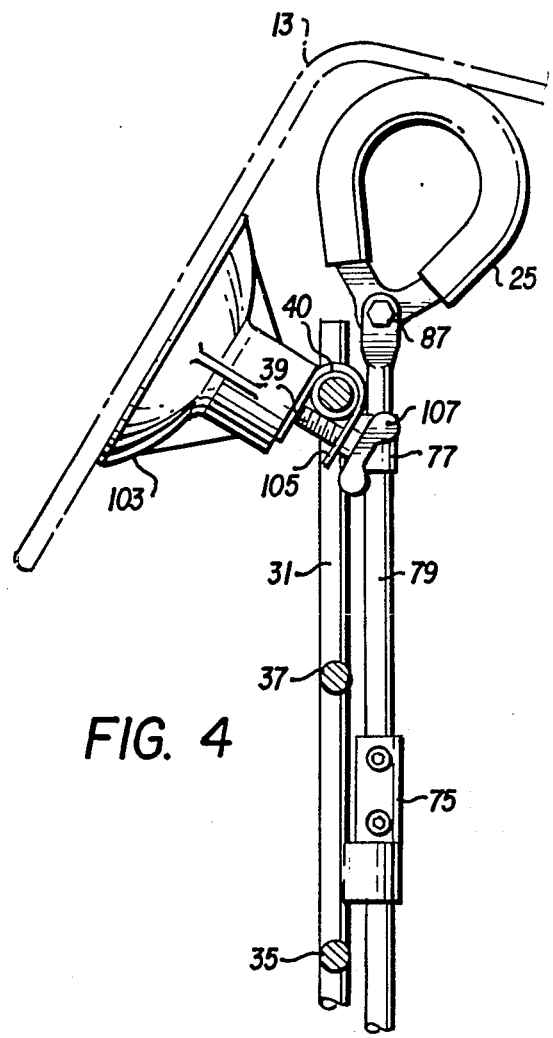
FIG. 4 is a sectional view taken along the lines 4—4 of FIG. 2.

Referring now to FIG. 3 as well as FIG. 2, sleeves 75 and 77 are secured to rod 31. Rod 79 passes through these sleeves and terminates at its upper end in a borehole through which a lock bolt may be placed so as to attach side rod 83. The same type of structure is used so as to attach side rod 85. Additionally, spacer 25 is also secured in a rotatable fashion by means of the bolt 87. As can be seen in FIGS. 1 and 4, this spacer 25, which is preferably rubber coated, acts as a spacer support for the lid of the trunk when the grillwork is in place. Rods 83 and 85 terminate in sleeves 89 and 91, through which rods 93 and 95 pass. Rods 93 and 95 terminate in sleeves 94 and 96, through which rods 83 and 85 pass so as to again provide an adjustable feature for the side grill. Plate 97 is rotatably secured to the ends of rods 93 and 95 by means of bolts 99 or the like. Shoe 101 is welded to plate 99 and serves as a sliding member, as will be discussed as the description proceeds.

FIG. 4 is a partial view showing the use of the spacer support 25. As indicated, it is adjustably attached to the end of rod 79 by means of a lock bolt 87. Accordingly, it could be adjusted to mate with the trunk lid of the car. It should be noted that FIG. 4 is an illustration of the trunk lid in its raised position, wherein the framework, including the rear frame 17, is held against the inside surface of the trunk lid by a suction device 103. This suction device is mounted on rod 39, which is preferably covered by a rubber sleeve 40, by means of U-shaped steel spring member 105 which passes about rod 39 and has holes therein through which wing bolt 107 passes and enters the body of the suction cup 103. This structure also allows the suction cup to be rotated so that it is in the proper position to mate with the lid of the trunk. As will be evident, this allows the trunk to be opened without removing the grillwork. When the trunk is raised, shoe 101, which rests in the rain trough of the trunk, slides along the trough so that the side elements are raised to a substantially vertical position.

Figure 5:
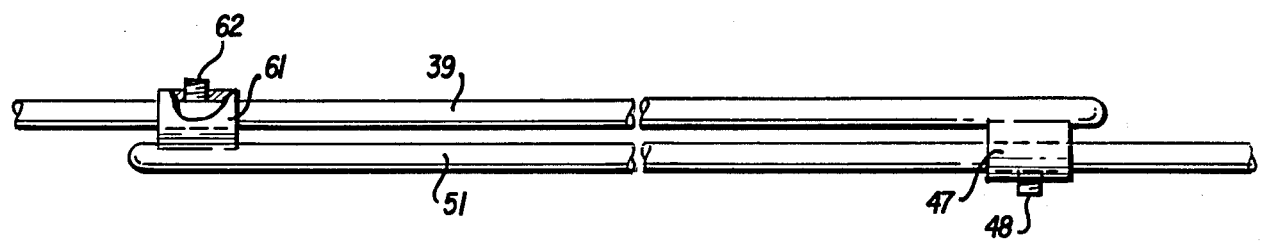
FIG. 5 is a partial view taken along the lines 5—5 of FIG. 2.

FIG. 5 is a partial view of rods 39 and 51 showing the use of setscrews 48 and 62 with sleeves 47 and 61. Accordingly, once the sections are adjusted to the proper length, the setscrews are used to hold that position for that particular-automobile.

Figure 6:
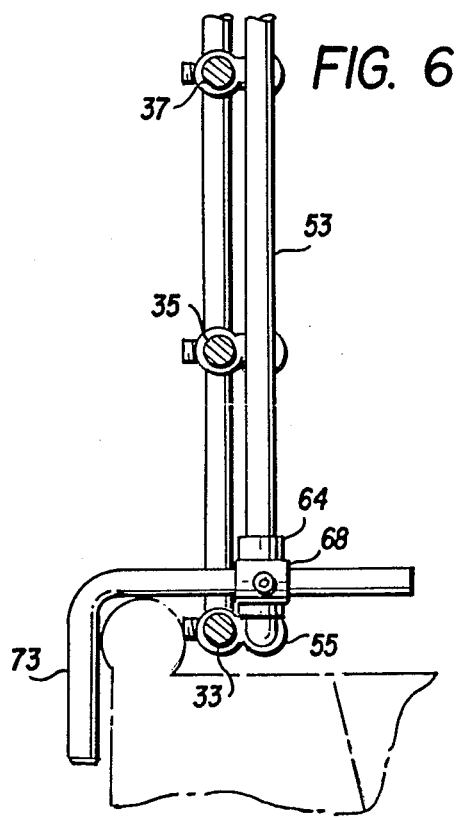
FIG. 6 is a sectional view taken along the lines 6—6 of FIG. 2.

FIG. 6 more clearly shows the use of the L-shaped hooks which are in place and which pass over the inside of the trunk assembly, as indicated in FIG. 1.

In order to hold the grillwork downwardly in place as shown in FIG. 1, a lock bar may be used which is adapted to operate with the normal trunk locking mechanism. One such lock bar 110, shown in FIG. 7, includes pipe 111 which terminates at its lower end in a bifurcate member 113 having tapholes 115 in the two sections of the member. The upper end of pipe 111 includes nut 117 welded to the pipe. Rod 119 is threaded as shown and may be threaded into nut 117 to the desired height. Rod 119 terminates in ring 121 and its position can be set by tightening locknut 123.

Figure 8:
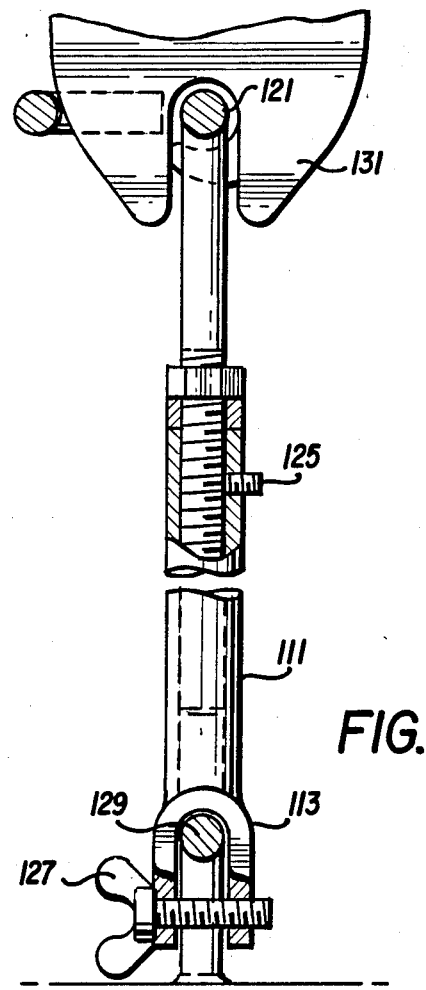
FIG. 8 is a partial sectional view of the support of FIG. 7 in place in the automobile.

FIG. 8 discloses the method in which this lock bar is used. Bifurcate member 113 passes over locking ring 113 at the base or bottom of the open trunk. Such a locking ring is in common usage in American automobiles. Member 113 is then secured in position by wing bolt 127. Loop 121 snaps into lock 131 in the trunk lid in the same manner as would locking ring 129. Setscrew 125 is also used to lock rod 119 in position. It will be quite obvious that this particular combination requires that the trunk key be used to unlock the pet carrier. It should also be noted that because of the arrangement, when the mechanism is unlocked and the trunk lid is raised, while the grillwork raises with the trunk lid, sleeve 111 and rod 119 conveniently fall to the floor of the trunk and, therefore, are out of the way.

Figure 9:
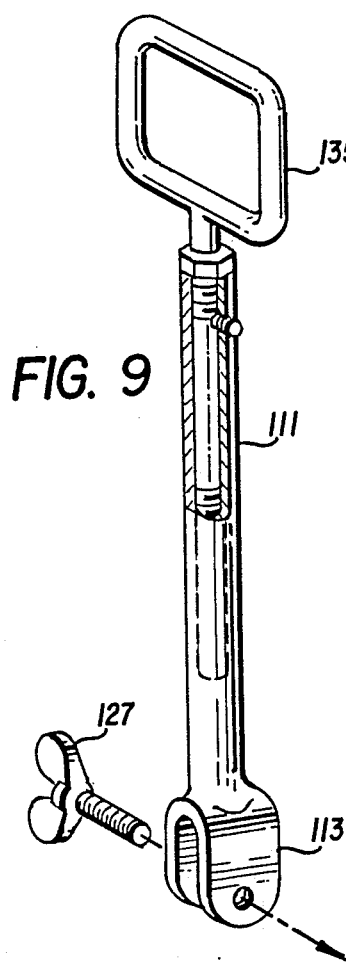
FIG. 9 is a perspective view of a modification of the support of FIG. 7.

FIG. 9 shows a modification of the lock bar of FIG. 8 having loop 135 in a substantially vertical configuration rather than a horizontal configuration. This is one form of ring which is used to be adapted to certain automobile constructions.

Figure 7:
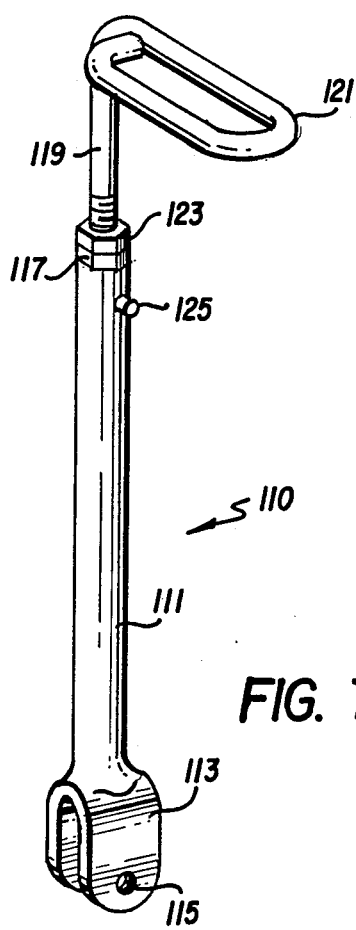
FIG. 7 is a perspective view of one trunk lock support mechanism.
Figure 10:
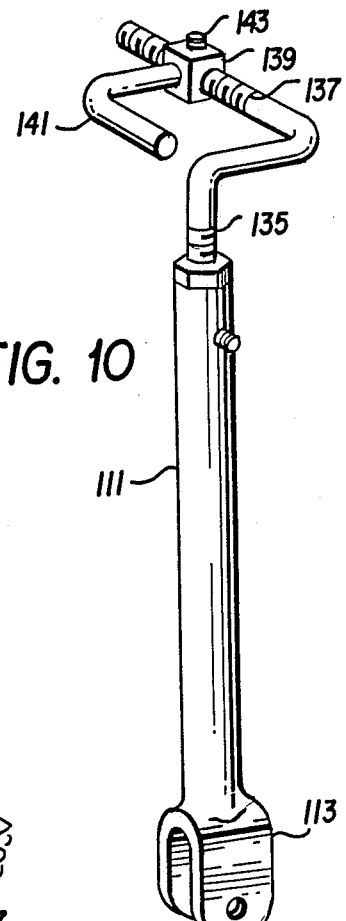
FIG. 10 is a perspective view of a further modification of the support of FIG. 7.

FIG. 10 discloses a lock bar similar to the basic structure of FIG. 7 except that rod 135 is configured so as to contain a first right angle bend and a second right angle bend which forms the loop. The end of rod 135 is threaded and a nut 139 is threaded onto the rod. Nut 139 has an L-shaped bar 141 welded thereto. Bar 141 is held in position by locknut 143. This configuration allows the bar to be adjusted in all directions. Thus, it accommodates the possibility of some automobile trunk locks which might differ from the usual lock. Again, this lock bar must be opened with the trunk key.

Figure 11:
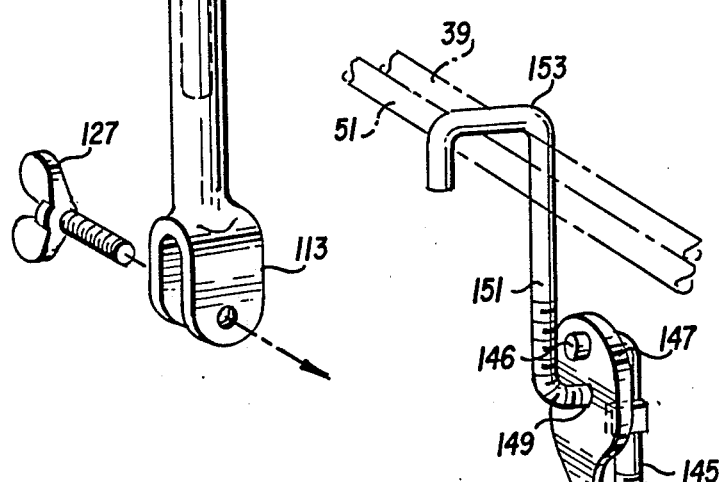
FIG. 11 is a perspective view of a further modification of the support of FIG. 7.

FIG. 11 shows a lock bar which is used for those automobiles which have self-locking trunks and whose owners do not wish to unplug the electrical connection actuating the lock. This locking device includes rod 145 which has a right angle bend which terminates at end 146. An eccentric 147 is rotatable about the end 146 of bar 145. A further bar 151 is threaded into a tap 149 of eccentric 147 and extends upwardly so as to form hook 153. This hook is designed to pass over upper bars 39 and 51 in the rear section of the grillwork, as shown by the dotted lines.

When handle 148 is raised, hook 153 is raised and may pass over bars 39 and 51. When handle 148 is lowered, it will cause hook 153 to engage the bars. This locks the pet carrier shut. Since the carrier is already attached to the trunk lid of the car, the trunk lid of the car will not move upwardly.

Figure 12:
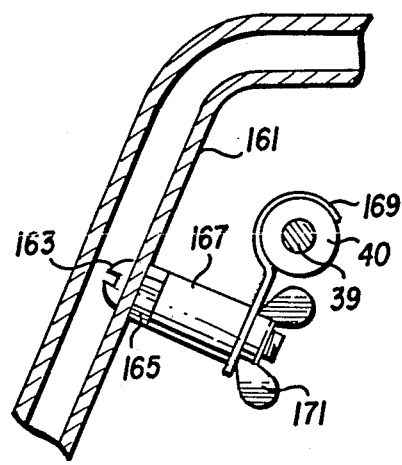
FIG. 12 is a partial sectional view of an alternate method of securing the apparatus to the lid of the automobile.

FIG. 12 is a partial sectional view of a means for securing the rear grillwork section to the underside of the trunk lid of the car wherein the particular underside of the trunk lid does not adapt itself to the use of suction cups. In order to use this device, holes are drilled in the underside 161 of the trunk lid and bolts 163 are inserted from the top down, with nuts 165 being tightened against the underside of the trunk lid. A spacer 167 is applied over bolt 163 and clip 169 is placed on bolt 163 and passes over rubber bushings 40 of rod 39. Wing nut 171 is then tightened so as to secure the clip about the rod. If it is desirable to remove the grillwork from the trunk, clips 169 may be left in place for future use.

As will now be evident, the present invention provides means for carrying a pet in a trunk with such means being substantially universal in that it is adaptable to all automobile trunks. It should further be noted that when the grillwork is not in use, because of its telescoping nature, it may be stored in a very compact bundle so as to be ready for any future use. It may even be telescoped and stored in the trunk of the car.

The above description and drawings are illustrative, only, since equivalent components such as tubular material could be substituted without departing from the invention, the scope of which is to be limited only by the following claims.

I claim:

1. Grillwork for containing a pet within a partially open trunk lid of a vehicle comprising a rear grill panel adjustable in length and adapted to rest on the inner rear of the trunk of a vehicle so that said rear grill extends upwardly from said trunk;

first and second side grill panels rotatably mounted to opposite ends of said rear grill panel, said side grill panels being adjustable in length;

means on the distal ends of said side grill panels adapted to rest in and slide along the rain troughs in the trunk of a vehicle;

first means adapted to removably secure said grill panels to the underside of the lid of a trunk of a vehicle; whereby said rear grill panel raises and lowers with said trunk lid and the distal ends of said side grill panels slide along the rain troughs in said trunk; and second means adapted to secure said grillwork in place when said trunk is partially closed.

2. The grillwork of claim 1 further comprising spacer means mounted to the upper end of said side panels adjacent said rear panel.

3. The grillwork of claim 2 further comprising means for adjusting said spacer means relative to said side panels.

4. The grillwork of claim 1 wherein said rear panel comprises mating grill sections which telescope with respect to each other.

5. The grillwork of claim 1 wherein said side panels comprise mating grill sections which telescope with respect to each other.

6. The grillwork of claim 1 wherein said first means comprises a suction cup adjustably mounted to said grillwork adapted to mate with the underside of a trunk lid of a vehicle.

7. The grillwork of claim 1 wherein said first means comprises a bolt adapted to be secured to the underside of a vehicle trunk lid; and a clip removably secured to said bolt for mating with said grillwork.

8. The grillwork of claim 1 wherein said second means comprises a lock bar, adjustable in length, terminating in a bifurcate member at one end adapted for passing over the locking ring at the bottom of a vehicle trunk;

a bolt for securing said bifurcate member to said locking ring;

a loop at the distal end of said lock bar adapted to mate with the lock in a vehicle trunk lid; and a set screw for securing said lock bar at a length such that said rear grill panel rests on the inner rear of the trunk when said lock bar is secured in place between said locking ring and said lock in said trunk lid.

9. The grillwork of claim 1 wherein said second means comprises a lock bar, adjustable in length, terminating in a bifurcate member at one end adapted for passing over the locking ring at the bottom of a vehicle trunk;

a bolt for securing said bifurcate member to said locking ring;

a hook at the distal end of said lock bar adapted for passing over said rear grill panel; and a set screw for securing said lock bar at a length such that said rear grill panel rests on the inner rear of the trunk when said lock bar is secured between said locking ring and said rear grill panel.

* * * * *